United States Patent Office 2,893,430
Patented July 7, 1959

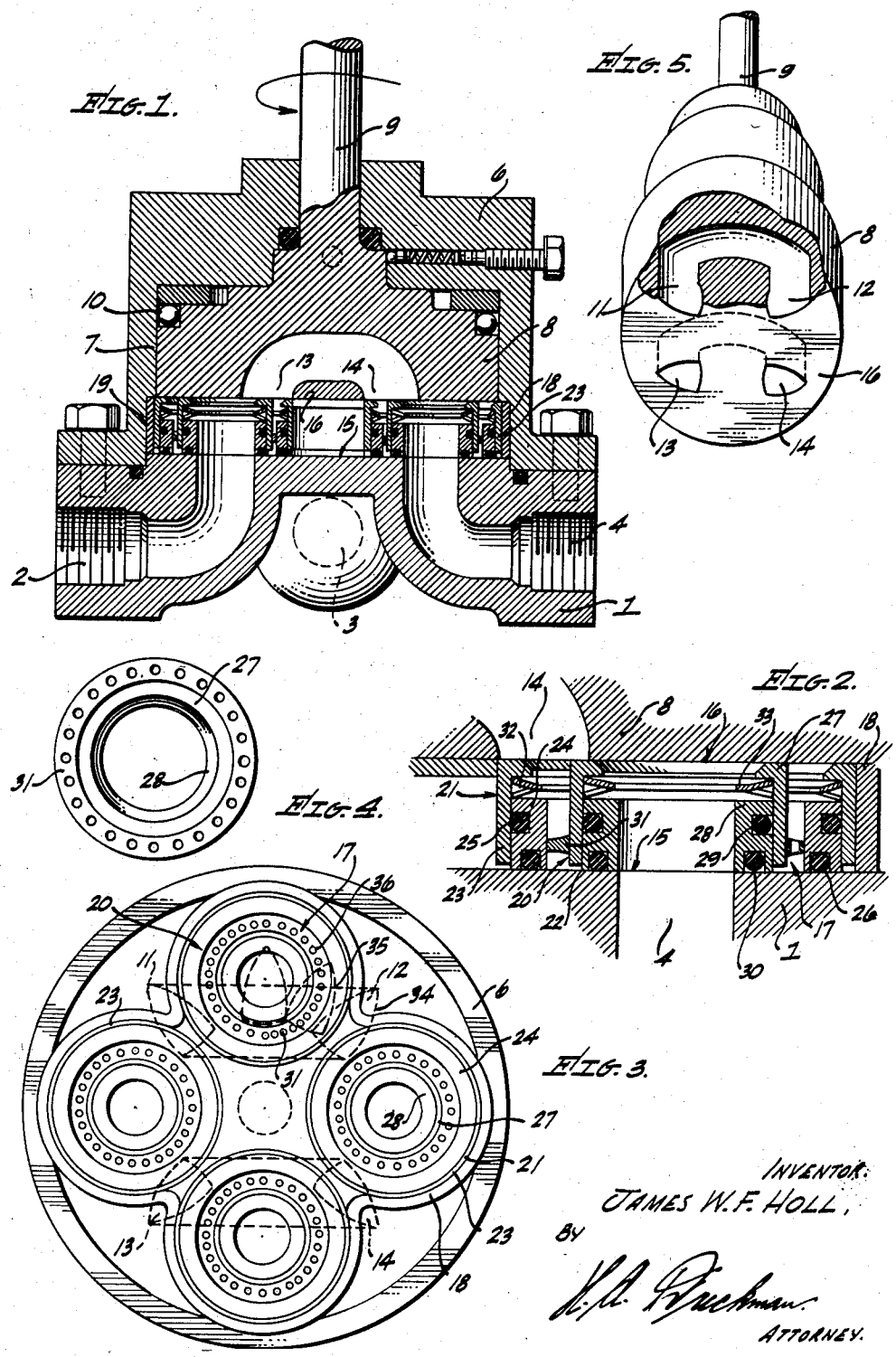

2,893,430
NONINTERFLOW ROTARY VALVE
James W. F. Holl, Temple City, Calif.

Application September 16, 1954, Serial No. 456,434

9 Claims. (Cl. 137—625.42)

This invention relates to a noninterflow rotary valve whereby flow between the various ports of the valve or between a port and the return or sump port of the valve is prevented. Particularly interflow is prevented between partially aligned ports and the sump so that the proper pressure is maintained in the hydraulic lines at all times.

An object of my invention is to provide a novel rotary valve which is so constructed and arranged that interflow or leakage is prevented from the pressure side of the valve to the return or sump side thereof.

Another object of my invention is to provide a novel rotary valve of the character stated in which spaced sealing means are provided around each of the ports thereof, the rotary disc having fluid ducts therein, which ducts move over the spaced sealing means as the disc is rotated.

Another object of my invention is to so shape the ports in the rotary disc of the valve that the overall size of the valve is reduced, and also the particular shape of these ports or ducts prevents interflow when they are moving from open to closed position. Furthermore, the valve can be partly opened or "cracked" with complete control and the fluid will not rush back into the sump.

Still another object of my invention is to provide a novel seal seat construction for a rotary valve, the seats being assembled as a unit or cartridge and are adapted to fit into a bore or recess in the body of the valve. Thus the seal seats can be assembled at the factory and will effectively fit into any valve adapted to this type of seat.

Still another object of my invention is to provide a novel rotary valve of the character stated in which accurate throttling is possible.

Other objects, advantages and features of invention may appear from the accompanying drawing, the subjoined detailed description and the appended claims.

In the drawing:

Figure 1 is a transverse sectional view of my noninterflow rotary valve.

Figure 2 is an enlarged fragmentary transverse sectional view through one of the seal seat assemblies.

Figure 3 is a bottom plan view of the body of the valve showing the seal seats in position.

Figure 4 is a bottom plan view of one of the seal seat units.

Figure 5 is a perspective view of the rotary disc with parts broken away to show interior construction.

Referring more particularly to the drawing, the numeral 1 indicates the valve body in which there are four (more or less) ports 2, 3, 4 and 5 provided. These ports are variously connected to exterior hydraulic lines (not shown) and fluid is conducted from one port to another, as desired, by rotation of the rotary disc, which will be subsequently described. A cap 6 is mounted on the body 1 and is preferably bolted in this position to complete the housing assembly of the valve. The cap 6 defines a chamber 7 in which the rotary disc 8 is accurately fitted. The disc 8 includes a shaft 9 which extends out through the top of the cap 6 and a wheel or lever is attached to this shaft for the purpose of rotating the disc, all of which is usual and well known. An annular bearing 10 is provided between the upper surface of the disc 8 and the top surface of the recess 7, thus providing a thrust bearing for the disc and enabling this disc to be more readily rotated. The disc 8 is provided with four ports, 11, 12, 13 and 14, which are connected in pairs, as shown in Figure 5. It will thus be evident that by rotating the disc 8 the ports 11, 12, 13 and 14 therein can be variously aligned with the ports 2, 3, 4 and 5 in the body 1, and thus variously conduct the fluid to different hydraulic lines.

The body 1 is formed with a flat upper surface 15 and the disc 8 is provided with a flat bottom surface 16. While the surfaces 15 and 16 should be as nearly parallel as possible, however, in manufacturing it is difficult to hold these surfaces to close tolerances as far as parallelism is concerned. To accomplish an effective seal between the surfaces 15 and 16, especially when the disc 8 is rotated from one position to another, I provide seal seat assemblies 17 which are constructed as follows: A cup 18, preferably formed of metal, is arranged in the space 19 between the surfaces 15 and 16. Mounted in the cup 18 are a plurality (four in this case) of seal seat assemblies 20. The seal seat assemblies 20 are each mounted with a press fit in the cup 18 and the cup may be shaped to partially encircle each of the seal seat assemblies. Each assembly consists of an outer packing ring 21 and an inner packing ring 22 spaced therefrom. The outer ring 21 includes a sleeve 23 which bears against the surface 16 of the disc 8. An inner sleeve 24 fits within the sleeve 23 and is provided with an O-ring 25 which bears against the inner surface of the sleeve 23. A bottom O-ring 26 bears against the flat surface 15 and thus seals against this surface and prevents leakage around the bottom of the sleeve 24. A second concentric packing assembly is positioned within the seat assembly just described and is constructed as follows:

An outer ring 27 bears against the bottom surface 16 of the disc 8. An inner sleeve 28 fits within the sleeve 27 and is provided with an O-ring packing 29 to seat against the inner surface of the sleeve 27. A second O-ring packing 30 bears against the flat surface 15 of the body 1 and prevents leakage around the bottom of the sleeve, as will be evident. A spacing flange 31 extends horizontally from the sleeve 27 and engages the sleeve 24 for the purpose of accurately spacing the sleeve 27 from the sleeve 24. The flange 31 may have holes extending therethrough so that fluid can pass readily from top to bottom and around the outside of the sleeve 27. A spring 32 bears against the top of the sleeve 24 to press this sleeve downwardly against the surface 15. Similarly a spring 33 bears against the top of the sleeve 28 for the purpose of pressing this sleeve against the surface 15.

The edges of the ports 11, 12, 13 and 14 are particularly shaped. They are substantially triangular but with the edges being somewhat curved. The shape and size of these ports can be altered somewhat for different purposes, that is, to provide a valve which will open or close more or less quickly, the only requirement being that these ports do not simultaneously overlap the sleeve assemblies 20 and 21 at any time. However, the substantially triangular shape of the ports is of importance for the following reasons: Viewing Figure 3 it will be seen that the ports in the dotted position 34 overlap the adjacent outer sleeve assemblies of adjacent seal seats. In this position the valve is closed. In the next dotted position 35 the valve is just starting to open since an edge of the port is now within the inner sleeve 27. The third dotted line position 36 is in the fully open position of the valve and the port is within the sleeve 28 where full flow can occur. In Figure 2 the port is shown in its closed position and it will be noted that the sleeves 23 and 27 are so spaced that they seal the port and prevent leakage or interflow within the valve. The shape of the ports, i.e., substantially triangular and with curved edges, cooperates with the seal seat assemblies 17 to permit accurate throttling and permits flow of fluid under pressure into a hydraulic line and without any leakage back to the sump or the return line of the valve.

Referring to the dotted line position 35 in Figure 3 again it will be observed that accurate throttling will occur since the edge of the port partially overlaps the inner sleeve 27 to begin to open the valve and the remainder of the port lies completely within the outer sleeve 23 which prevents the escape of fluid into the valve body space between the surfaces 15 and 16. It is apparent that without the outer sealing ring 21, the fluid would immediately flow into the valve body as soon as the port reaches the dotted line position 35 and no accurate throttling could occur.

Further, if fluid were permitted to enter the valve body in this manner, it would immediately flow into the sump port which would also be partially aligned with one of the other ports in the rotating disc 8. This would result in a significant pressure drop which in a high pressure system is very objectionable.

Therefore, because of the presence of the double seal seat assembly there is always one seal between the pressurized port and valve body space between the surfaces 15 and 16 so that at no time can the pressurized fluid be dissipated by leaking into or out of the valve body. It is for this reason that the valve of the present invention is referred to as a noninterflow valve.

Having described my invention, I claim:

1. In a valve having substantially parallel spaced surfaces therein and alignable ports extending through said surfaces, a seal seat assembly comprising a first seal seat means adapted to be positioned between the surfaces and fixed in alignment with one of the ports for confining fluid flow between said one port and another of the ports alignable therewith, means for resiliently urging said first sealing means into sealing engagement with both of the surfaces, and a second seal seat means concentrically disposed about said first seal seat means and radially spaced therefrom a distance greater than the corresponding dimension of said other port so that said other port cannot simultaneously overlap said first and second seal seat means whereby said second seal seat means prevents fluid that escapes beyond said first seal seat means as said other port is being aligned with said one port from flowing into other parts of the valve body.

2. In a non-interflow valve having spaced-apart surfaces with alignable ports extending through said surfaces, seal seat means having an aperture therethrough adapted to be aligned with and fixed relative to one of the ports and having a seat on one end thereof engaging the surface surrounding said one port to provide a seal completely thereabout, the other end of said seal seat means having two radially spaced concentric seats thereon engaging the other surface, the port in said other surface alignable with said one port having a predetermined size and configuration so that it cannot simultaneously overlap said two concentric seats, and means for urging the ends of said seal seat means in opposite directions to maintain said seats in sealing engagement with their respective surfaces.

3. A seal seat assembly for a noninterflow valve having spaced apart surfaces with alignable ports extending through the surfaces, comprising a first pair of telescoping sleeves adapted to be aligned with and fixed relative to one of the ports of one of the surfaces, spring means for urging said sleeves in opposite directions whereby the ends thereof may be urged into sealing engagement with the surfaces, a second pair of telescoping sleeves disposed about said first pair of sleeves, and spring means for urging the second pair of sleeves in opposite directions whereby the ends thereof may be urged into sealing engagement with the surfaces to prevent fluid that escapes past the first pair of telescoping sleeves as a port in the other of the surfaces is being aligned with said one port from flowing into other parts of the valve body.

4. The subject matter as claimed in claim 3 including an O-ring disposed between each pair of sleeves, each of said O-rings being fixed to one sleeve and slidably bearing against the other sleeve of the pair.

5. The subject matter as claimed in claim 3 including an apertured spacing ring disposed between said pairs of sleeves for maintaining them in concentric spaced-apart relationship.

6. A seal seat assembly for a noninterflow valve having spaced apart surfaces with a plurality of alignable ports extending through the surfaces comprising a retaining element disposed between said surfaces and fixed relative to one of said surfaces, a plurality of seal seat assemblies mounted within said element in spaced-apart oriented relationship, each of said seal seat assemblies comprising concentric radially spaced-apart sleeve assemblies, each of said sleeve assemblies including a pair of telescoping sleeves and means for resiliently urging said sleeves apart and into sealing engagement with said surfaces, each of said sleeve assemblies being aligned with and fixed relative to a different one of the ports in said one surface.

7. A multi-way noninterflow valve comprising a valve body having spaced-apart substantially parallel surfaces therein, each of said surfaces having a plurality of ports extending therethrough, the ports of one of said surfaces being selectively alignable with the ports of the other of said surfaces, a plurality of seal seat assemblies, each of said seal seat assemblies comprising a first sleeve mean aligned with and fixed relative to one of the ports in said other surface, means for urging the ends of said sleeve means into sealing engagement with said surfaces, a second sleeve means disposed about said first sleeve means, and means for urging the ends of said second sleeve means into sealing engagement with said surfaces, the ports of said one surface having a predetermined size so as not to simultaneously overlap the inner periphery of said second sleeve means in sealing engagement with said one surface whereby fluid is prevented from flowing into said valve body as a port in said one surface is being aligned with a port in said other surface.

8. A multi-way noninterflow valve comprising a valve body having spaced-apart substantially parallel surfaces therein, each of said surfaces having a plurality of ports extending therethrough, the ports of one of said surfaces being selectively alignable with the ports of the other of said surfaces, a plurality of seal seat assemblies, each of said seal seat assemblies comprising a first pair of telescoping sleeves aligned with and fixed relative to one of the ports in said other surface, spring means for urging the ends of said sleeves into sealing engagement with said surfaces, a second pair of telescoping sleeves disposed about said first pair of sleeves, and spring means for urging the ends of said second pair of sleeves into sealing engagement with said surfaces, the ports of said one surface having a predetermined size so as not to simultaneously overlap the inner periphery of said first and the outer periphery of said second pair of telescoping sleeves in sealing engagement with said one surface whereby fluid is prevented from flowing into said valve body as a port in said one surface is being aligned with a port in said other surface.

9. In a valve having a flat internal surface with a port extending therethrough and a movable member therein having a flat surface thereon movable relative to said valve surface in a plane parallel to and spaced from the valve surface, the surface of said member having a port extending therethrough alignable with the port extending through the surface of said valve, a seal seat assembly comprising a first seal seat means adapted to be positioned between the surfaces with one end thereof fixed in alignment with one of the ports and providing a seal thereabout for confining fluid flow between said one port and the other port alignable therewith, means for resiliently urging said first sealing means into sealing engagement with the surface through which said other port extends, and a second seal seat means concentrically disposed about and movable axially relative to said first seat means and radially spaced therefrom a distance greater than the corresponding dimension of said other port so that said other port cannot simultaneously overlap said first and second seal seat means whereby said second seal seat means prevents fluid that escapes beyond said first seal seat means as said other port is being aligned with said one port from flowing into other parts of the valve body.

References Cited in the file of this patent

UNITED STATES PATENTS

| | | |
|---|---|---|
| 2,377,473 | Wolcott | June 5, 1945 |
| 2,443,071 | Honerkamp et al. | June 8, 1948 |
| 2,529,412 | Parker | Nov. 7, 1950 |
| 2,626,166 | Fawick | Jan. 20, 1953 |
| 2,628,060 | Parker | Feb. 10, 1953 |
| 2,669,417 | Ray | Feb. 16, 1954 |
| 2,688,981 | Greer | Sept. 14, 1954 |
| 2,696,219 | Barksdale | Dec. 7, 1954 |

FOREIGN PATENTS

| | | |
|---|---|---|
| 829,905 | France | of 1938 |

UNITED STATES PATENT OFFICE

CERTIFICATE OF CORRECTION

Patent No. 2,893,430                                                                            July 7, 1959

James W. F. Holl

It is hereby certified that error appears in the printed specification of the above numbered patent requiring correction and that the said Letters Patent should read as corrected below.

Column 4, line 36, for "mean" read -- means --; line 44, after "of" insert -- said first and the outer periphery of --.

Signed and sealed this 26th day of April 1960.

(SEAL)
Attest:

KARL H. AXLINE                                                 ROBERT C. WATSON
Attesting Officer                                             Commissioner of Patents